US008753184B2

(12) United States Patent
Goldenberg

(10) Patent No.: US 8,753,184 B2
(45) Date of Patent: Jun. 17, 2014

(54) SYSTEM AND METHOD FOR INTERACTIVE GAMEPLAY WITH SONG LYRIC DATABASE

(76) Inventor: David Goldenberg, San Francisco, CA (US)

( * ) Notice: Subject to any disclaimer, the term of this patent is extended or adjusted under 35 U.S.C. 154(b) by 0 days.

(21) Appl. No.: 13/438,998

(22) Filed: Apr. 4, 2012

(65) Prior Publication Data

US 2013/0267287 A1 Oct. 10, 2013

(51) Int. Cl.
*A63F 9/18* (2006.01)
*G09B 7/06* (2006.01)

(52) U.S. Cl.
USPC ............... 463/9; 434/322; 434/327; 273/429; 273/430

(58) Field of Classification Search
CPC .................. A63F 2300/8064; A63F 2009/183; A63F 2009/185; A63F 2009/186; A63F 2009/188; A63F 9/18; G09B 7/00; G09B 7/06
USPC .............. 463/9, 10, 35, 40–42; 273/429, 430; 434/307 R, 308, 321, 322, 327; 705/14.14
See application file for complete search history.

(56) References Cited

U.S. PATENT DOCUMENTS

| | | | |
|---|---|---|---|
| 5,697,844 A * | 12/1997 | Von Kohorn | ................... 463/40 |
| 2004/0206228 A1 * | 10/2004 | Suzuki et al. | ................... 84/615 |
| 2009/0253476 A1 * | 10/2009 | Pestotnik | ......................... 463/9 |
| 2012/0221975 A1 * | 8/2012 | Juristovski et al. | ........... 715/823 |

* cited by examiner

*Primary Examiner* — Damon Pierce
(74) *Attorney, Agent, or Firm* — Pillsbury Winthrop Shaw Pittman LLP

(57) ABSTRACT

A system and method for playing an interactive song lyric guessing game is provided. Some aspects present a player with a scrambled word cloud of lyrics and asks the player to select the correct name of the artist or song from a list of possible answers. Advertising and other commercially useful information are presented to the user and collected from the user in the course of playing the game. For example, the player of the game may be directed to an online store where songs can be purchased or downloaded.

17 Claims, 6 Drawing Sheets

SYSTEM AND METHOD FOR INTERACTIVE GAMEPLAY WITH SONG LYRIC DATABASE

TECHNICAL FIELD

The present disclosure relates to systems and methods for online gameplay. Specifically for playing a game where the player is challenged to select a correct answer corresponding to scrambled song lyrics from a lyric database presented to the user. The game may be played on a computer connected to a network including the game server and song lyric database.

BACKGROUND

Interactive electronic and computer games have proliferated. The games include aspects that entertain their users or players. Other aspects generate profit for the party putting on the games or distributing or selling the games. Other aspects raise awareness of an issue or promote a product or a company.

One common aspect to gaming, especially online gaming, is that a player can interact with a client machine (computer, mobile device) by way of a browser or client application. The client machine then uses an interface and a network (wired, wireless) connection to interact with a server machine that serves content and information to the client for the purpose of driving the game play. Another feature of online gaming, especially in games that are free to players to play, is that the game is used as a platform for promotion of other things. This can be done by presenting pop up type or banner type advertising to a player of the game. Yet another common feature of online gaming is to encourage a player to sign up for a service or to create an account or to join a database of players that include information about the player. Providers of interactive games can benefit from information about the community of players, including demographic information and information about why the players like the game or dislike it and information about what interests the players and how the players react to the game and the products and services being promoted.

It is useful to provide a game that offers players interested in music a way to play and compete to test their music lyrics knowledge and related song and music group trivia.

SUMMARY

A system and method for playing an interactive song lyric guessing game is provided. Some aspects present a player with a scrambled word cloud of lyrics and asks the player to select the correct name of the artist or song from a list of possible answers. Advertising and other commercially useful information are presented to the user and collected from the user in the course of playing the game. For example, the player of the game may be directed to an online store where songs can be purchased or downloaded.

BRIEF DESCRIPTION OF THE DRAWINGS

A preferred embodiment of the invention will now be described by way of specific example with reference to the accompanying drawings, in which.

DETAILED DESCRIPTION

Figure 1:
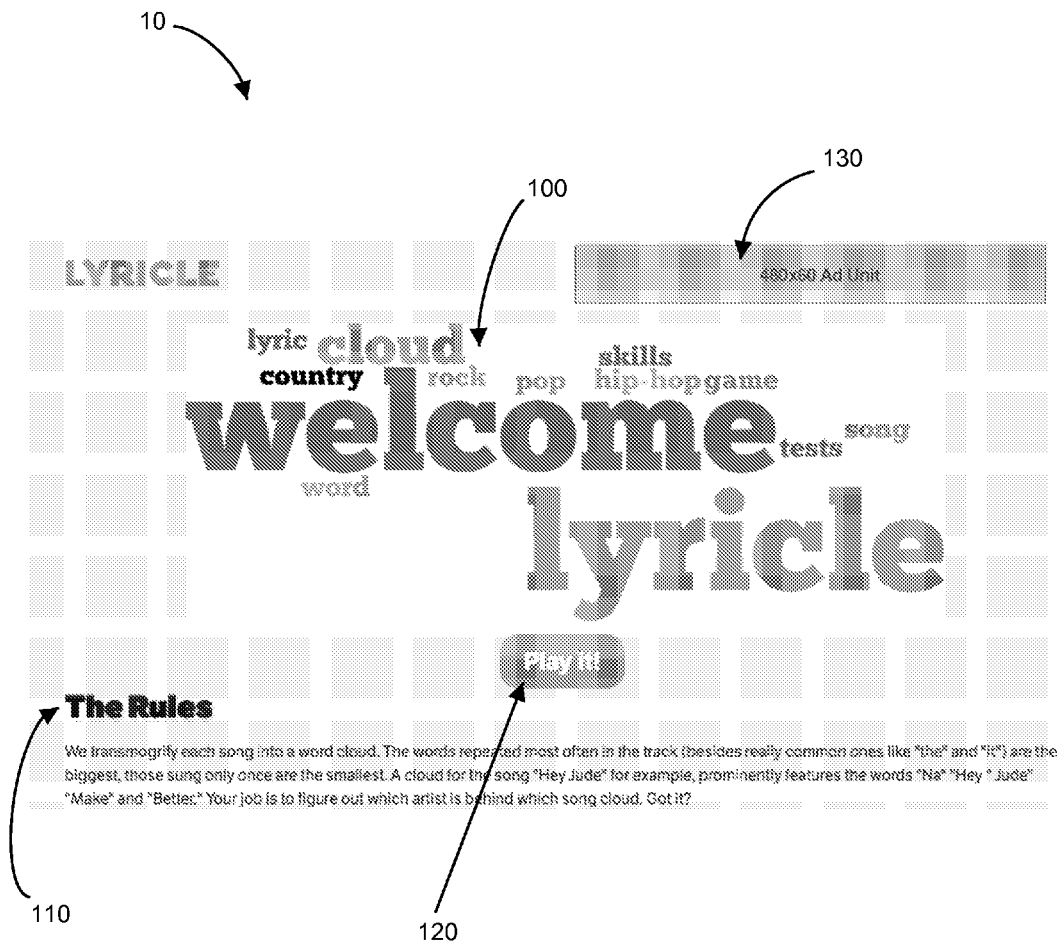
FIG. 1 illustrates an exemplary main application interface or screen.

FIG. 1 illustrates a main screen 10 presented to a player at a client computer console. The main screen 10 includes a welcome graphic 100 or other message. It may also include a short or detailed recitation of the rules of the game 110. An advertising message such as a pop-up or banner advertisement 130 may also be presented to the user. The advertising message 130 may be correlated with one or more attributes of the player, for example his or her gender, age, existing user profile, or other information. A button 120 can be activated by the user to initiate a new game session.

Figure 2:
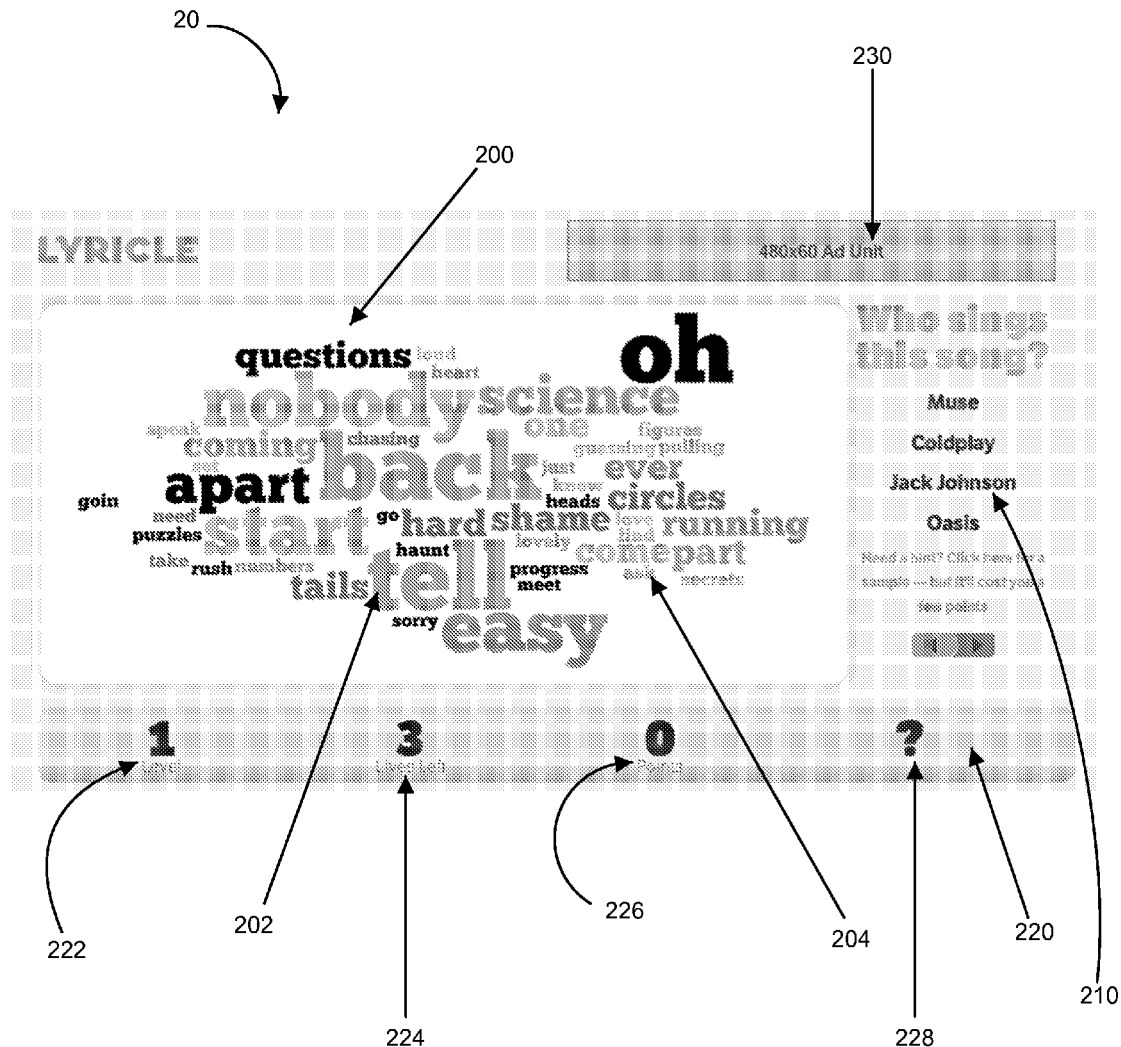
FIG. 2 illustrates an exemplary game session interface or screen.

FIG. 2 illustrates a game session screen 20. The game session presents the user with a word cloud 200 that includes various words captured from a database of song lyrics and shuffled and presented in a graphical form to the player. The organization or appearance of the words from the lyric database may correspond to the importance or the frequency of the appearance of each word in the lyric database for the song. For example, a word 202 that appears often in the lyrics of the song may be presented in a larger font than a word 204 that appears less frequently in the lyrics of the song. The screen 20 then presents to the player a list of possible answers from which the player can select the correct answer. For example, the player may be asked at 210 "who sings this song?" and the player may be presented with several candidate artists who sing the song for which the lyrics are provided in portion 200 of the screen.

The screen 20 may also include a status bar 220. Status bar 220 may include a level of skill at which the player is playing 222, a number of lives left for the player in this game 224, the points accumulated in the course of playing this game 226, and a help icon such as a question mark 228.

Figure 3:
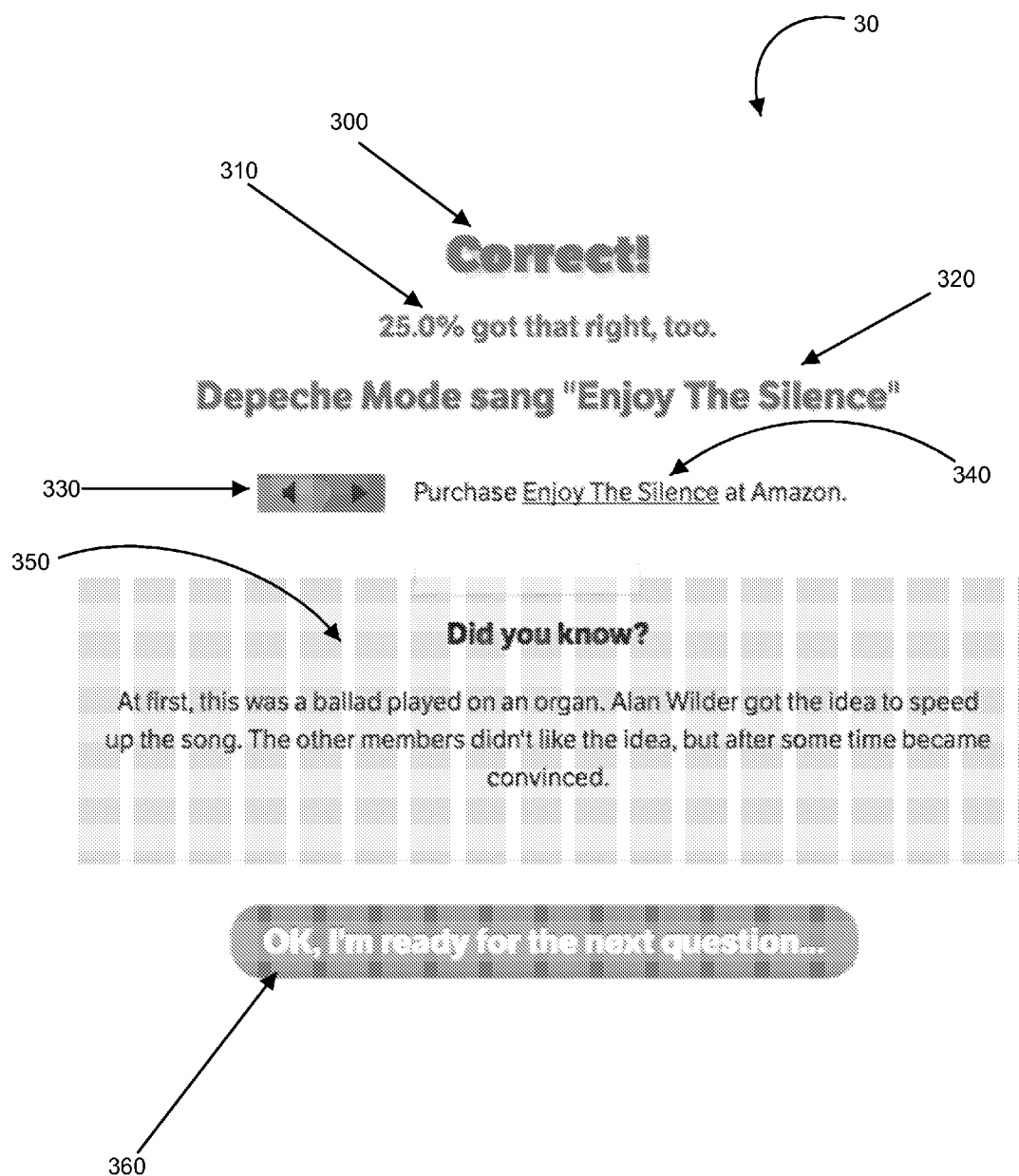
FIG. 3 illustrates an exemplary correct answer interface or screen.
Figure 4:
FIG. 4 illustrates an exemplary wrong answer interface or screen.
Figure 5:
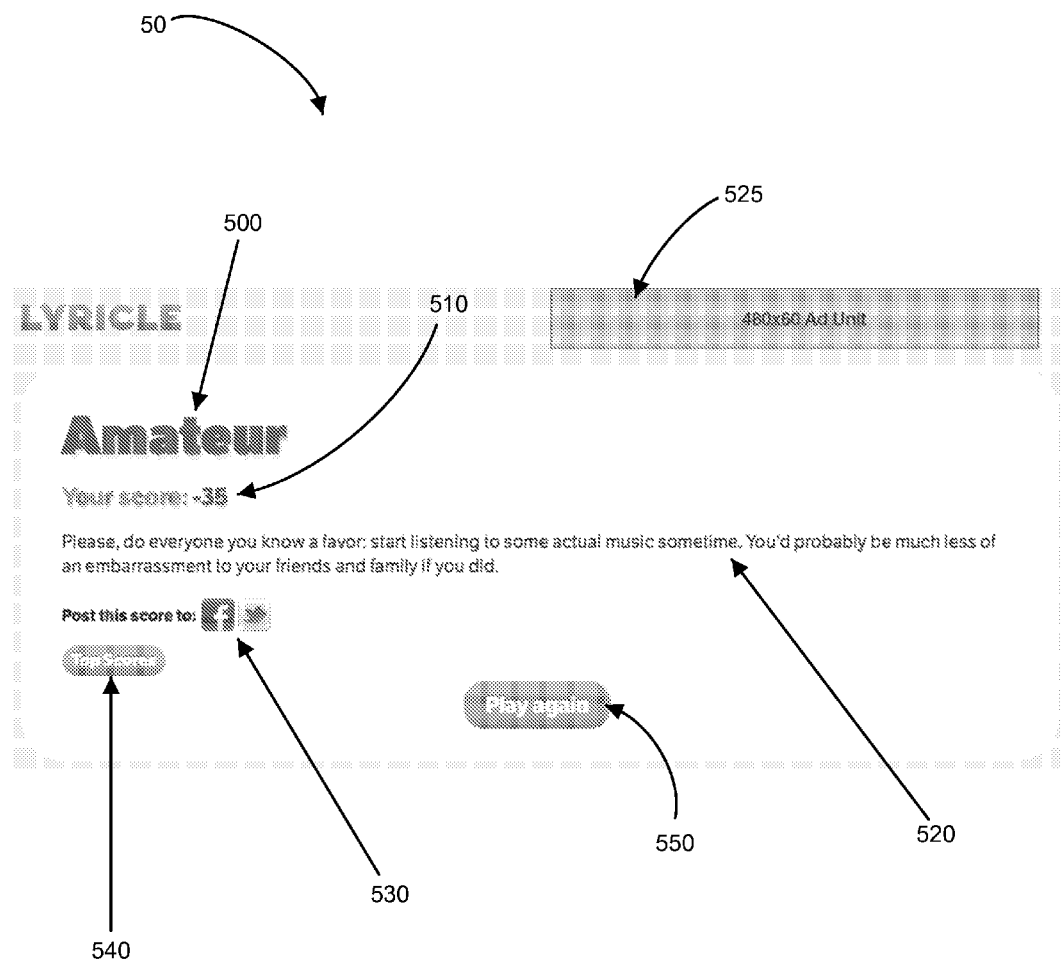
FIG. 5 illustrates an exemplary game conclusion interface or screen.

FIG. 3 illustrates a screen that may be presented to a player if the player correctly selects the answer to the question asked in FIG. 2. For example, correct answer screen 30 may include the word "correct!" 300. It may also include an indication of the percent of other players that also got the correct answer to this question. A summary of the correct answer may be presented at 320, for example, restating which band sang the song from which the lyrics were chosen for that segment of the game.

In some aspects the game may provide an icon 330 which when depressed or activated will give a preview of the song that is the subject of the segment of the game being player by the player. In addition, a link 340 may be provided to the player allowing the player to activate or click the link to be redirected to a place where the player can purchase the song online if the player wants to purchase the song.

In other aspects, some interesting trivia relating to the song or the artist in question at a given segment of the game may be presented to the user at 350. A button or other user interface element 360 is also provided to the player is that he or she may proceed to the next segment of the game and play it again or be challenged by another question.

An incorrect answer screen 40 is displayed if the player selects an incorrect answer to a question being asked in FIG. 2. The incorrect answer screen may present a phrase such as "Sorry, that is incorrect" 400. The incorrect answer screen 40 may also present the percentage of other players of the game who got the same question wrong 410. The incorrect answer screen may provide the correct answer to the question asked in FIG. 2, for example listing the artist and the name of the song 420 from which the lyrics in FIG. 2 were derived.

As stated before, an icon 430 may be provided for playing a sample of the song in question, and a link 440 may be provided to allow the user to purchase the song from some source such as an online music store. A button 450 is provided to allow the user to click the button 450 to play another round of the game.

Once the player has exhausted his or her remaining lives or once another criterion has been attained indicating the end of a game session, a conclusion screen 50 is presented to the player. Game conclusion screen 50 shows the player their title 500, for example amateur, intermediate, expert, wizard, or other entertaining title achieved by the player in playing the game. The player may also be provided his or her score 510. A comment 520 can give useful information to the player or induce the player to sign onto some service or cause the player to take some other action. Once again, an advertising link or advertisement banner 525 may be displayed on the screen.

In addition, the player may be presented with social media icons or links 530 on the game conclusion screen allowing the player to post their game score to one or more social media sites to share with friends or a community of players.

The player may select or click on a button 540 that will cause a list of top scores to be displayed so that the player can see how they compare to other players of the game. As before, a play again button 550 is resented to the player to encourage him or her to play another session of the game.

Figure 6:
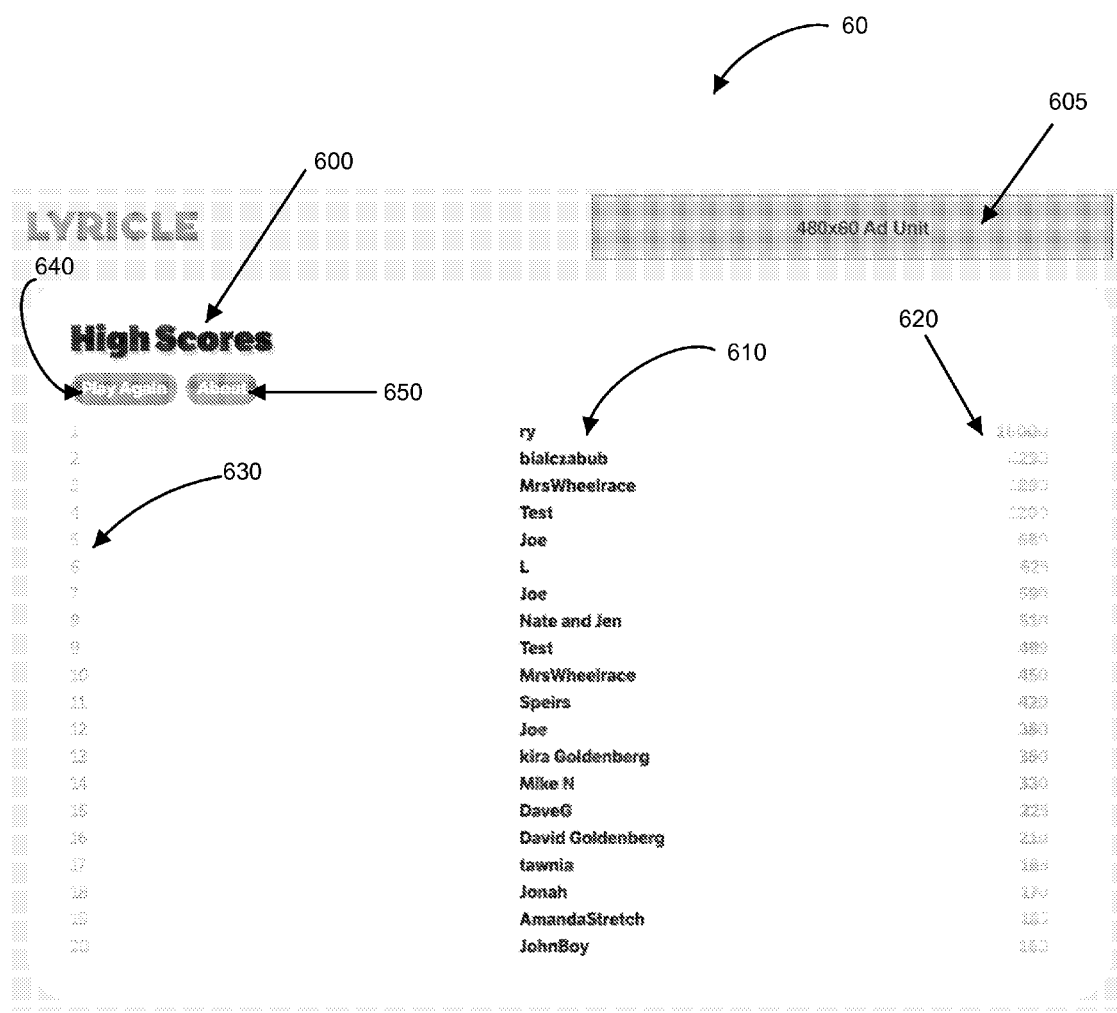
FIG. 6 illustrates an exemplary top scores interface or screen.

If the player presses or selects the top scores button 540, the player would be presented with a top scores screen 60 as shown in FIG. 6.

The top scores screen 60 includes an advertising banner 605, a ranking column 630, the names of players 610 corresponding to the ranks 630. The actual top scores 620 of each player 610 are also presented in the top score screen 60. As before, a play again button 640 is presented to allow the player to play another session of the game. An about button 650 may be provided which will present the player with information about the game or other information from the game provider.

The present gaming application system and method may be implemented on a computer or processor-based machine such as a server or other network-capable device. Communication may be carried out using conventional packet-based or standards-based messaging. A Web front end including a Web server may be employed to provide interactivity with users of client machines interacting with the Web server. A database of information relating to the game data (bands, songs, lyrics, music files, user profiles, etc.) may be provided and coupled to the Web server or other backend application server coupled to the Web server. An application programming interface (API) may further be provided to supply information used in game play over HTTP or other means. Some logic can further be installed on and executing on the players' client computers.

The embodiments and description and drawings provided herein are illustrative and allow those skilled in the art to understand the inventions and to incorporate the inventions into systems and methods comprehended by the present disclosure and claims. The present embodiments should therefore not be considered exhaustive or limiting, but other derivative and similar techniques and devices relating hereto should be considered covered by the present scope of invention as well.

What is claimed is:

1. A system for interactive gameplay involving selection of a proper answer to a question related to scrambled song lyrics, the system comprising:
   a server comprising one or more physical processors programmed with computer program instructions to:
   obtain a plurality of words of a lyric of a song, the plurality of words comprising at least a first word and at least a second word, the first word and the second word having a particular order in the lyric with respect to one another;
   generate a presentation that includes: (i) the first word at a first position in the presentation, and (ii) the second word at a second position different from the first position in the presentation such that the particular order of the first word and the second word in the lyric is obscured based on the first position and the second position;
   generate at least one question based on the presentation;
   provide the at least one question to be answered;
   receive a response to the at least one question; and
   provide a result indicative of whether the response is correct.

2. The system of claim 1, wherein the one or more processors are further programmed to:
   determine a first frequency of occurrence of the first word in the lyric of the song, wherein a first visual appearance of the first word in the presentation is determined based on the first frequency of occurrence.

3. The system of claim 1, further comprising a database that includes sorted rankings of player scores.

4. The system of claim 1, further comprising an application server that services applications on mobile communication devices and that relays information between the mobile communication devices and the server.

5. The system of claim 2, wherein the one or more processors are further programmed to:
   determine a second frequency of occurrence of the second word in the lyric of the song, the second frequency of occurrence being different from the first frequency of occurrence, wherein a second visual appearance of the second word in the presentation is determined that is different than the first visual appearance based on the first frequency of occurrence and the second frequency of occurrence.

6. The system of claim 2, wherein the first visual appearance comprises a font of the first word in the presentation, the one or more processors further programmed to:
   determine the font of the first word in the presentation based on the first frequency of occurrence.

7. The system of claim 2, wherein the first visual appearance comprises a size of the first word in the presentation, the one or more processors further programmed to:
   determine the size of the first word in the presentation based on the first frequency of occurrence.

8. The system of claim 2, wherein the one or more processors are further programmed to:
   determine the first position based on the first frequency of occurrence.

9. The system of claim 1, wherein the presentation comprises a graphical presentation.

10. The system of claim 9, wherein the generated question comprises the graphical presentation and at least one text portion that includes potential responses to the generated at least one question.

11. The system of claim 1, wherein the one or more processors are further programmed to:
   provide trivia information relating to the at least one question.

12. The system of claim 1, wherein the one or more processors are further programmed to:
  obtain a user profile related to a user that is provided with the at least one question;
  determine advertising based on the user profile; and
  provide the advertising during game play.

13. The system of claim 1, wherein the one or more processors are further programmed to:
  obtain, directly or indirectly, information relating to a preference of a user that is provided with the at least one question.

14. The system of claim 1, wherein the one or more processors are further programmed to:
  provide a user that is provided with the at least one question with a selectable icon that when selected causes at least a portion of the song to be played.

15. The system of claim 1, wherein the one or more processors are further programmed to:
  provide a selectable link to purchase the song.

16. The system of claim 1, wherein the one or more processors are further programmed to:
  provide an optional hint to assist a user that is provided with the at least one question in determining the correct answer;
  receive an indication that the user has selected the optional hint; and
  provide the optional hint responsive to the indication.

17. A computer implemented method for interactive gameplay involving selection of a proper answer to a question related to scrambled song lyrics, the method being implemented on a computing device having one or more physical processors programmed with computer program instructions, the method comprising:
  obtaining, by the one or more physical processors, a plurality of words of a lyric of a song, the plurality of words comprising at least a first word and at least a second word, the first word and the second word having a particular order in the lyric with respect to one another;
  generating, by the one or more physical processors, a presentation that includes: (i) the first word at a first position in the presentation, and (ii) the second word at a second position different from the first position in the presentation such that the particular order of the first word and the second word in the lyric is obscured based on the first position and the second position;
  generating, by the one or more physical processors, at least one question based on the presentation;
  providing, by the one or more physical processors, the at least one question to be answered;
  receiving, by the one or more physical processors, a response to the at least one question; and
  providing, by the one or more physical processors, a result indicative of whether the response is correct.

* * * * *